United States Patent [19]

Felker

[11] Patent Number: 4,664,209
[45] Date of Patent: May 12, 1987

[54] TECHNIQUE FOR REPAIRING UNDERSIDES OF VEHICLES

[76] Inventor: R. Guy Felker, 5866 Hampshire, Corpus Christi, Tex. 78408

[21] Appl. No.: 816,214

[22] Filed: Jan. 6, 1986

[51] Int. Cl.$^4$ .............................................. B62D 25/02
[52] U.S. Cl. .................................. 180/90.6; 180/89.1; 296/185
[58] Field of Search .............................. 180/90.6, 89.1; 280/153 R; 296/1 R, 185, 187, 193, 31 R, 31 P; 29/402.1, 402.9

[56] References Cited

U.S. PATENT DOCUMENTS

| | | | |
|---|---|---|---|
| 3,212,809 | 10/1965 | Johnston | 296/1 |
| 3,424,265 | 1/1969 | Stata | 180/90.6 |
| 3,541,668 | 11/1970 | Wessells et al. | 296/193 |
| 3,622,195 | 11/1971 | Lavtenbach | 296/1 R |
| 3,746,387 | 7/1973 | Schwenk | 296/31 P |
| 4,253,699 | 3/1981 | Frank | 180/90.6 |
| 4,392,684 | 7/1983 | Yoshitsugu et al. | 296/193 |
| 4,613,184 | 9/1986 | Rispeter et al. | 296/187 |

Primary Examiner—Richard A. Bertsch
Attorney, Agent, or Firm—G. Turner Moller

[57] ABSTRACT

A technique for repairing the front and rear floor pan areas of vehicles includes cutting away any corroded metal along with some sound metal to form a window in the underside of the vehicle which is bounded by a ledge. In the case of front floor pan areas, the insert is placed in the window and connected to the ledge by suitable fasteners. The front floor pan area insert extends from the chassis flange on one side of the vehicle to a location juxtaposed to a linkage tunnel extending down the center of the vehicle. Various embodiments of a rear floor pan area insert are shown, all of which incorporate peculiar configurations. Some of the rear floor pan embodiments are placed in the window from inside the vehicle and some cover the window by placement from the underside of the vehicle.

12 Claims, 10 Drawing Figures

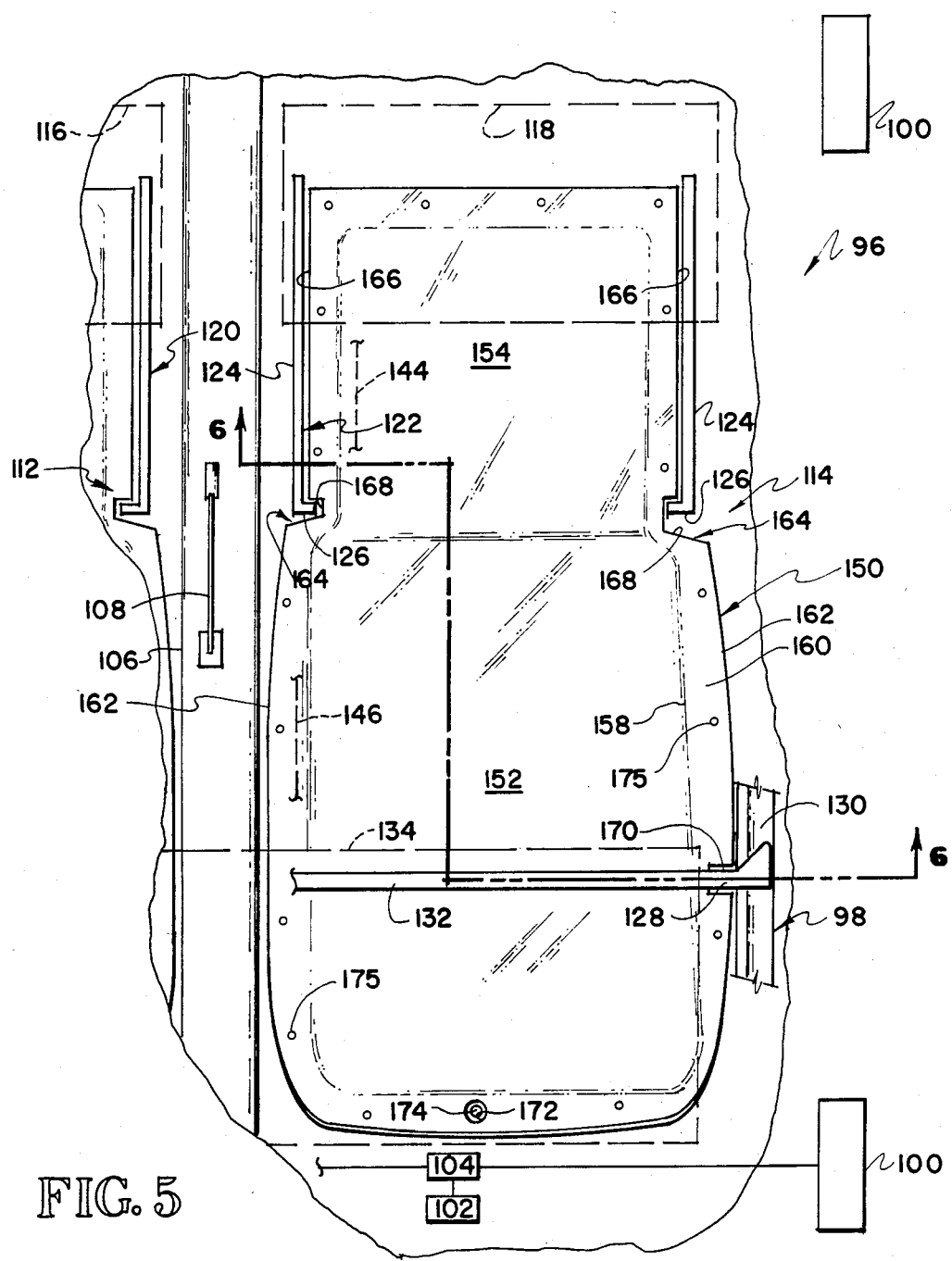
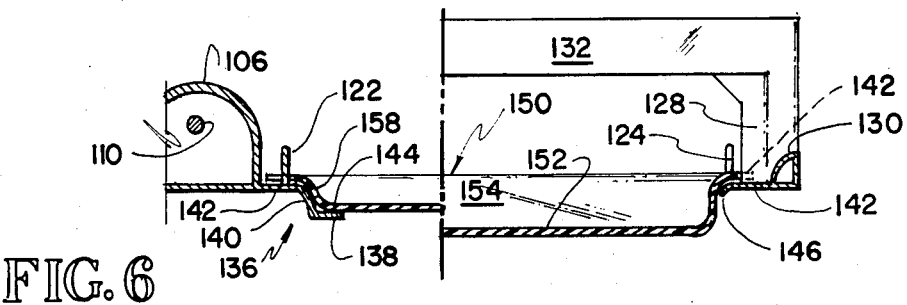

TECHNIQUE FOR REPAIRING UNDERSIDES OF VEHICLES

This invention relates to a technique for repairing the undersides of vehicles which have deteriorated for one of a variety of reasons.

One of the longest lived automobile types in the world is the Volkswagen Beetle. The first Beetles were made before World War II, the last imported to the United States in 1979 and the vehicles are still being made in Brazil and Mexico. One of the peculiarities of this vehicle is that the underside of the body deteriorates to leave holes therein through which water can pass. Even though many of the major components, such as engines and transmissions, are easy to repair and/or replace, there is little sense of conducting major repairs of water comes through the bottom of the vehicle.

Obviously, one can restore metal on the bottom of the car by cutting out the rusted areas and welding new metal in place. This is, of course, time consuming, expensive and beyond the ability or desire of many, including most do-it-yourself handymen. In response to this need, there was developed a fiberglass insert which would fit the rear seat area, both passenger's and driver's sides, of some year model VW Beetles. Unfortunately, these inserts would not fit the front seat areas, nor other makes or models of vehicles, even other models made by Volkswagen. This situation is aggravated because of the lack of parts from the original manufacturer, i.e. Volkswagen. Since the termination of production of the Beetle in Germany and the United States, the only factory-type source for body repair parts is from the Brazilian VW plant. Although there is available a Brazilian factory replacement part for the front seat pan area of late model Beetles, the labor cost of installing this part is beyond reason.

There is accordingly a need for a simplified technique for repairing the front seat pan areas of cars, vans and the like such as VW Beetles, Karmen Ghias, Model 3's, vans and other models of Volkswagens as well as for other model vehicles.

There is also a need for a simplified technique for repairing the rear seat pan areas of other model vehicles which the prior art inserts do not fit.

In summary, this invention includes a technique for repairing corroded front seat pan areas of vehicles by cutting away the corroded metal and a good bit of the sound metal to leave a ledge around the periphery of the front floor pan area. An insert is placed in the window formed by cutting away the metal of the floor pan area. The insert is preferably made of a fiberglass composite including layers of glass fiber cloth, glass fiber mat and an organic polymeric resin that hardens to produce a physically stout insert which is not subject to the vagaries of salt, water, or other corrosive agents that attack metal. The insert is provided with strengthened areas or ribs on the underside thereof that extend generally perpendicular to the direction of travel of the vehicle. Additional ribs which extend more-or-less from front to rear may also be provided. On the driver's side, a thickened accelerator pad is provided on the underside of the insert at a location beneath the accelerator of the vehicle. This provide a mechanically strong area to which the accelerator is pivotally connected.

This invention also provides one or more solutions to problem rear seat pan areas which are not addressed by the prior art.

It is accordingly an object of this invention to provide an improved technique for repairing corroded front floor pan areas of vehicles.

Another object of this invention is to provide a simple, quick and inexpensive technique for repairing corroded front floor pan areas of vehicles.

Another object of this invention is to provide a simple, quick and inexpensive technique for repairing corroded rear floor pan areas of some model vehicles which are not within the purview of the prior art.

Other objects and advantages of this invention will become more fully apparent as this description proceeds, reference being made to the accompanying drawings and appended claims.

IN THE DRAWINGS

FIG. 5 is a top plan view of a rear passenger side floor pan area of a 1971-1972 year model VW convertible which has been repaired by an insert of this invention;

FIG. 6 is an enlarged cross-sectional view of the illustration of FIG. 5, taken substantially along line 6—6 thereof, as viewed in the direction indicated by the arrows;

Figure 1:
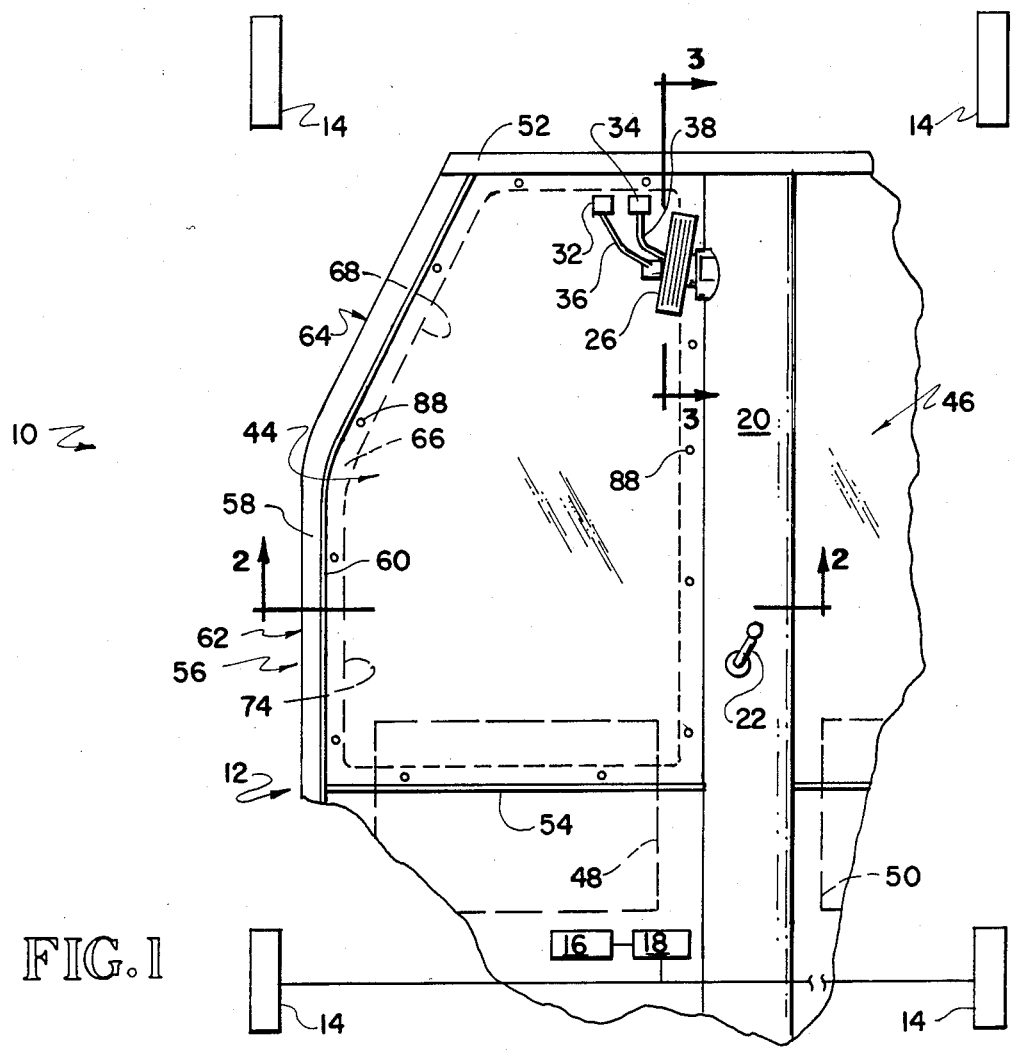
FIG. 1 is a top plan view of a front driver's side floor pan area of a vehicle which has been repaired in accordance with this invention.
Figure 2:
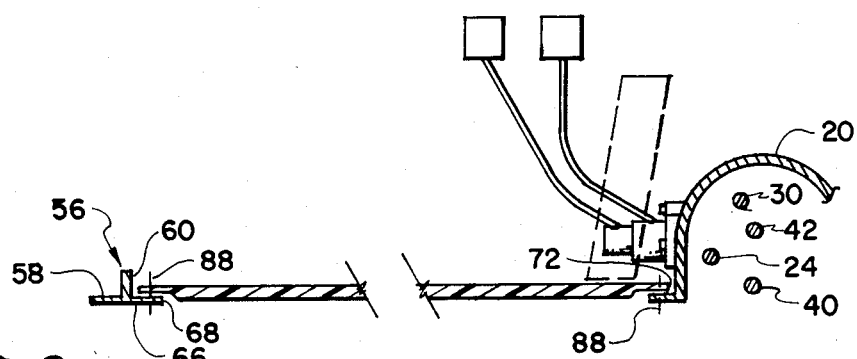
FIG. 2 is an enlarged cross-sectional view of the illustration of FIG. 1, taken substantially along line 1—1 thereof, as viewed in the direction indicated by the arrows.
Figure 3:
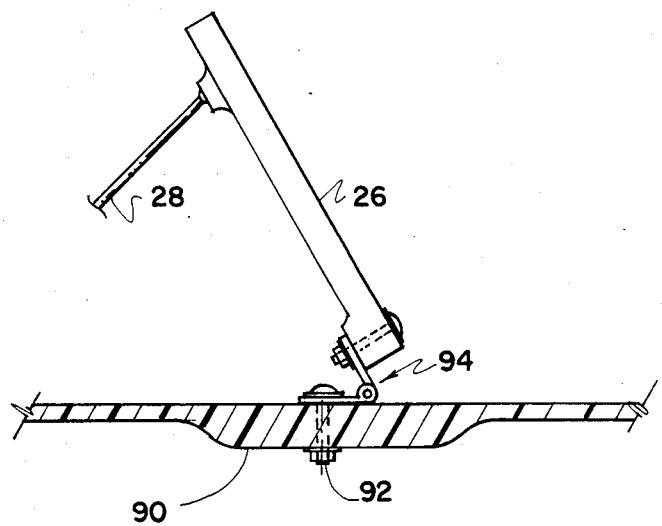
FIG. 3 is an enlarged cross-sectional view of the illustration of FIG. 1, taken substantially along line 3—3 thereof, as viewed in the direction indicated by the arrows.

Referring to FIGS. 1-3, there is illustrated a vehicle 10 comprising a chassis 12 having four wheels 14 supported thereon. An engine 16 and transmission 18 are mounted on the chassis 12 and act to drive at least two of the wheels 14 to propel the vehicle 10 down a roadway (not shown).

The chassis 12 of the vehicle 10 includes an elongate hollow linkage tunnel 20 on which is mounted on a gear shift lever 22. The lever 22 connects to a linkage 24 inside the tunnel 20 which in turn connects to the transmission 18 for manipulating the transmission 18 in a conventional manner. An accelerator 26 includes a link 28 extending into the tunnel 20 which is connected to another linkage 30 connected to the engine 16 for controlling the speed of the engine 16. A clutch pedal 32 and a brake pedal 34 are mounted on control arms 36, 38 which extend into the tunnel 20 and similarly connect to linkages 40, 42 inside the tunnel 20 for controlling the clutch (not shown) and brake (not shown) of the vehicle 10.

The front floor pan areas 44, 46 of the vehicle 10 are partially located beneath a pair of front seats 48, 50 which are conventionally called driver's and passenger's seats. Specifically, the front floor pan areas 44, 46 start beneath the front seats 48, 50 and extend forwardly toward the front of the vehicle 10. The problem with many vehicles is that the front floor pan areas 44, 46 corrode, due to salt on the roads, exposure to splashed water, or the like. For whatever reasons, the front floor pan areas 44, 46 corrode to the extent that holes are formed therein and water comes through the bottom of the vehicle 10 into the passenger compartment thereby making the vehicle 10 unsuitable for normal use. Often, the vehicle 10 is otherwise in quite satisfactory condition or can be made so by the overhaul of other major components. It makes no sense, of course, to repair other major components when the outside weather enters the passenger compartment through the floor of the vehicle 10.

In the vehicle 10, the front floor pan areas 44, 46 are bounded in the middle by the linkage tunnel 20, in the front by a prominent gusset 52 which extends generally perpendicular to the tunnel 20, and in the rear by a rather small rib 54 which extends perpendicularly from the tunnel 20 to adjacent a channel 56 defining the side of the vehicle 10. The channel 56 is of generally L-shaped cross-section having a planar bottom 58 extending away from the inside of the vehicle 10 and an upstanding rib 60, as shown best in FIGS. 1 and 2. The sides of the front floor pan areas 44, 46 are defined by the rib 60 of the channel 56 which includes a first section 62 generally parallel to the linkage tunnel 20 and a second section 64 inclined to the first section 62. The second channel section 64 joins the gusset 52 adjacent the front of the floor pan areas 44, 46 and defines therewith an obtuse angle.

The corroded area of the front floor pan areas 44, 46 is removed by cutting away the metal thereof. In addition, much of the sound metal is cut away to form a ledge 66 not more than about 3" in width extending away from the tunnel 20, the gusset 52, the rib 54 and the rib 60 on the channel sections 62, 64. This leaves a window 68 in the bottom or floor of the vehicle 10 which is shortly closed by an insert 70 of this invention. The remaining metal of the pre-existing front floor pan areas 44, 46 is prepared, by removing rust and scale and then priming or painting, to receive the insert 70 of this invention. It will be seen that removing the corroded and sound metal from the front floor pan areas 44, 46 to leave the ledge 66 makes the channel 56 appear to be of inverted T-cross-section rather than of L-cross-sectional shape.

Figure 4:
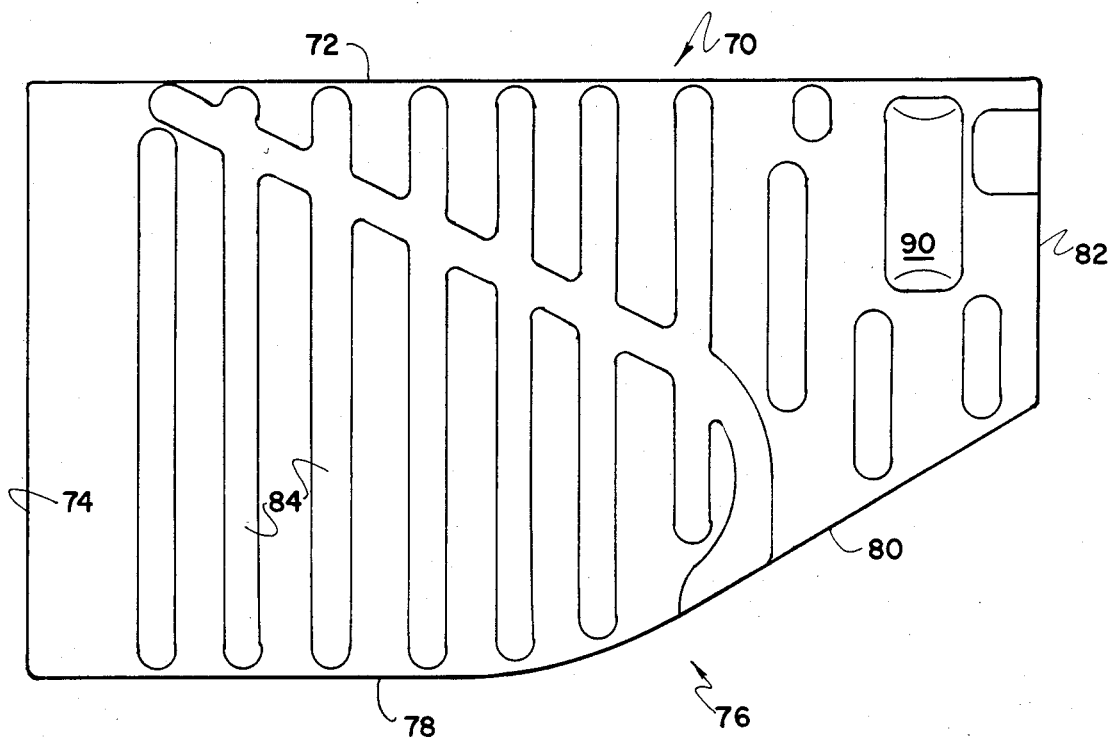
FIG. 4 is a bottom view of an insert of this invention which has been installed in a vehicle, as shown in FIGS. 1-3.

As shown best in FIG. 4, the insert 70 is substantially the same shape as the window 68 and includes a first long straight side 72 parallel and juxtaposed to the linkage tunnel 20 and a first long end 74 perpendicular to and adjoining the first side 72. The long end 74 is juxtaposed to the rib 54. The insert 70 also includes a second long side 76 comprising a first section 78 parallel and juxtaposed to the rib 60 of the first channel section 62 and a second section 80 parallel and juxtaposed to the rib 60 of the second channel section 64. The insert 70 also includes a second short end 82 parallel and juxtaposed to the gusset 52 and defining an obtuse angle relative to the second side section 80.

It will be seen that the insert 70 is a slightly irregular pentagon having ends perpendicular to a long base and a pair of sides opposite the base, one of the latter sides being parallel to the base. In another aspect, it will be seen that the insert 70 is basically rectangular in shape with part of one side, adjacent the second side section 80, being removed.

The insert 70 of this invention preferably comprises a fiberglass composite made from layers of glass fiber cloth and glass fiber mat wetted by a conventional organic polymeric resin, as is well known in the prior art. The insert 70 is essentially thin and flat but provides a multiplicity of ribs 84 on the underside of the insert 70 facing toward the ground over which the vehicle 10 rides. Although the insert 70 is generally flat and thin, the areas of the ribs 84 are thicker than the areas between the ribs 84. For some model vehicles, the insert 70 may provide different patterns of ribs, including an arcuate generally diagonally extending rib 86 which enhances front to rear rigidity of the insert 70.

After the front seats 48, 50 are removed along with the floor covering (not shown) of the vehicle 10, the corroded part of the front floor pan areas 44, 46 are cut away, as with the use of a saber saw, air chisel or the like to form the window 68 and the ledge 66. The sound metal remaining in the ledge 66 is then preferably painted or primed to deter future corrosion. The insert 70 is then positioned in the front floor pan area to closely fit juxtaposed to the channel rib 60 and the tunnel 20 on opposite sides of the front floor pan area 44. In addition, the insert 70 closely fits juxtaposed to the gusset 52 and the rib 54 on the front and back of the insert 70. Suitable fasteners 88, such as pop rivets, nut-bolt assemblies or the like, are then used to secure the insert 70 to the ledge 66.

The insert 70 for the driver's side of the vehicle 10 also includes an accelerator pad 90 on the underside therefore. The pad 90 is a built up area, of generally hemicylindrical shape, through which extends a plurality of fasteners 92 securing a hinge 94 to the insert 70. The hinge 94 is also attached to the accelerator 26 thereby mounting it for pivotal movement.

Referring to FIGS. 5 and 6, there is illustrated a vehicle 96, specifically a 1971-1972 year model Volkswagen Beetle convertible. The vehicle 96 comprises a chassis 98 having four wheels 100 supported thereon. An engine 102 and transmission 104 are mounted on the chassis 98 and act to drive at least two of the wheels 100 to propel the vehicle 96 down a roadway (not shown).

The chassis 98 of the vehicle 96 includes an elongate hollow linkage tunnel 106 on which is mounted a parking brake lever 108 located rearwardly of a gear shift lever (not shown) positioned similarly to the gear shift lever 22 shown in FIG. 1. The lever 108 connects to a linkage 110 inside the tunnel 106 which in turn connects to the brakes (not shown) of at least two of the wheels 100 for manually manipulating the brakes of the vehicle 96 for parking purposes, as is conventional.

The rear floor pan areas 112, 114 of the vehicle 96 are located partially beneath a pair of front seats 116, 118, which are conventionally called driver's and passenger's seats, and extend toward the rear of the vehicle 96. The seats 116, 118 are individually mounted on a pair of rails 120, 122 for linear sliding movement in a forward and rearward direction to provide more, or less, front seat leg room, as is conventional. As shown best by a comparison of FIGS. 5 and 6, the seat rails 120, 122 include an elongate linear section 124 which is downwardly inclined toward the rear of the vehicle and which terminates in an inwardly projecting stop 126 positioned generally perpendicularly to the inclined linear section 124. The chassis 98 of the vehicle 96 is also peculiar because it includes a strengthening rib or gusset 128 projecting inwardly of a tubular member 130. A brace 132, comprising part of the rear seat 134 of the vehicle, extends across the width of the vehicle 96 at a location below the rear seat cushion (not shown).

The rear floor pan areas 112, 114 each comprise a central sunken well 136 having a flat floor 138, an upstanding wall 140 and a generally horizontal flange 142 on each side of the linkage tunnel 106. The flat floors 138 typically corrode. In repairing the vehicle 96 in accordance with this invention, the corroded areas of the flat floors 138 and some of the sound metal are removed by cutting away the metal thereof by use of a saber saw, air chisel or the like to leave a ledge 144 not more than about 3" in width extending away from the juncture of the flat floor 138 and the rails 124. Away from the rails 124, the metal is cut at the juncture of the vertical wall 140 and the flange 142, as seen in FIG. 6. This leaves a window 146 in the flat floor 138 of the vehicle 96 which is shortly closed by an insert 150 of this invention. The remaining metal of the pre-existing rear floor pan areas 112, 114 is prepared, by removing rust and scale and then priming, to receive the insert 150 of this invention.

The insert 150 is sized to fit in the sunken wells 136 of the rear floor pan areas 112, 114 and provides a rearward generally flat section 152 and a forward slightly upwardly inclined flat section 154. A plurality of ribs (not shown) are provided on the undersides of the sections 152, 154 and face the roadway (not shown) over which the vehicle 96 rides. As in the embodiment of FIGS. 1–4, the thickness of the ribs is significantly greater than the thickness of the areas between the ribs.

The insert 150 includes an upstanding wall 158 adjoining the flat sections 152, 154 and an outwardly extending flange 160 overlying the flange 142 of the vehicle 96. It is conceivable, of course, the rear inserts used to repair corroded rear floor pan areas could be flat sections, analogous to the embodiment of FIGS. 1–4. In this circumstance, a very simple sheet of fiberglass composite could be employed on a very large number of vehicles. It is preferred, however, to provide the flanged rear floor pan insert 150 of this invention, even though it may fit only a relatively small number of vehicles. There are a variety of reasons for this. Most importantly, some of the structural strength in the original floor pan resides in the angular offset. By providing the inserts 150 of this invention with a similar offset, structural strength is retained. In addition, any collection of water, battery acid or the like in the insert 150 does not lead to corrosion as it would if the insert were flat.

The flange 160 of the insert 150 includes a number of interesting features. Adjacent the rear of the insert 150, the longitudinal sides 162 of the flange 160 converge toward the front only slightly. Because it is desirable to provide the flange 160 to assure a sound location to secure the insert 150 to the chassis 98, the flange 160 must be configured to avoid the seat rail stops 126. To this end, the flange 160 provide a pair of notches 164. At the rear end of the insert 150, the sides 166 converge slightly from the rear and toward the notches 164. At the forward end of the insert 150, the sides 166 are generally parallel to the rails 124 from the front of the insert 150 to the notch 164. It will accordingly be evident that the width of the flange 160, varies across the notches 164. Thus, the notches 164 each have generally L-shaped edges 168.

Another peculiar feature of the insert 150 is the provision of a notch 170 in the flange 160 adjacent the rib 128 to allow the insert 150 to be received under the brace 132. Even though the notch 170 may weaken the flange 160, models of this invention reveal that the flange 160 remains surprisingly rigid and exceptionally more rigid than a flange which is reduced in lateral extent about the entire periphery to allow for the rib 128.

Another interesting feature of the insert 150, when designed specifically for the rear passenger side floor pan area 114 is the provision of a passage 172 in the flange 160 in the center of the rear of the insert 150 to allow a battery ground post 174 to pass upwardly through the insert 150 while allowing the strength of the flange 160 to remain.

Similar to the insert 70, the insert 150 of this invention preferably comprises a fiberglass composite made of layers of glass fiber cloth and glass fiber mat wetted by a conventional organic polymeric resin, as is well known in the prior art.

The insert 150 is attached to the chassis 98 in any suitable manner, as by the use of fasteners 175 such as pop rivets, nut and bolt assemblies and the like. As will be evident, the fasteners 175 are spaced about the periphery of the insert 150 and extend through the flange 160 and the underlying metallic member 142 of the vehicle 96. Where the flange 160 is absent, i.e. on the forward end of the insert 150, the fasteners 175 extend through the forward flat end of the insert 150.

Figure 7:
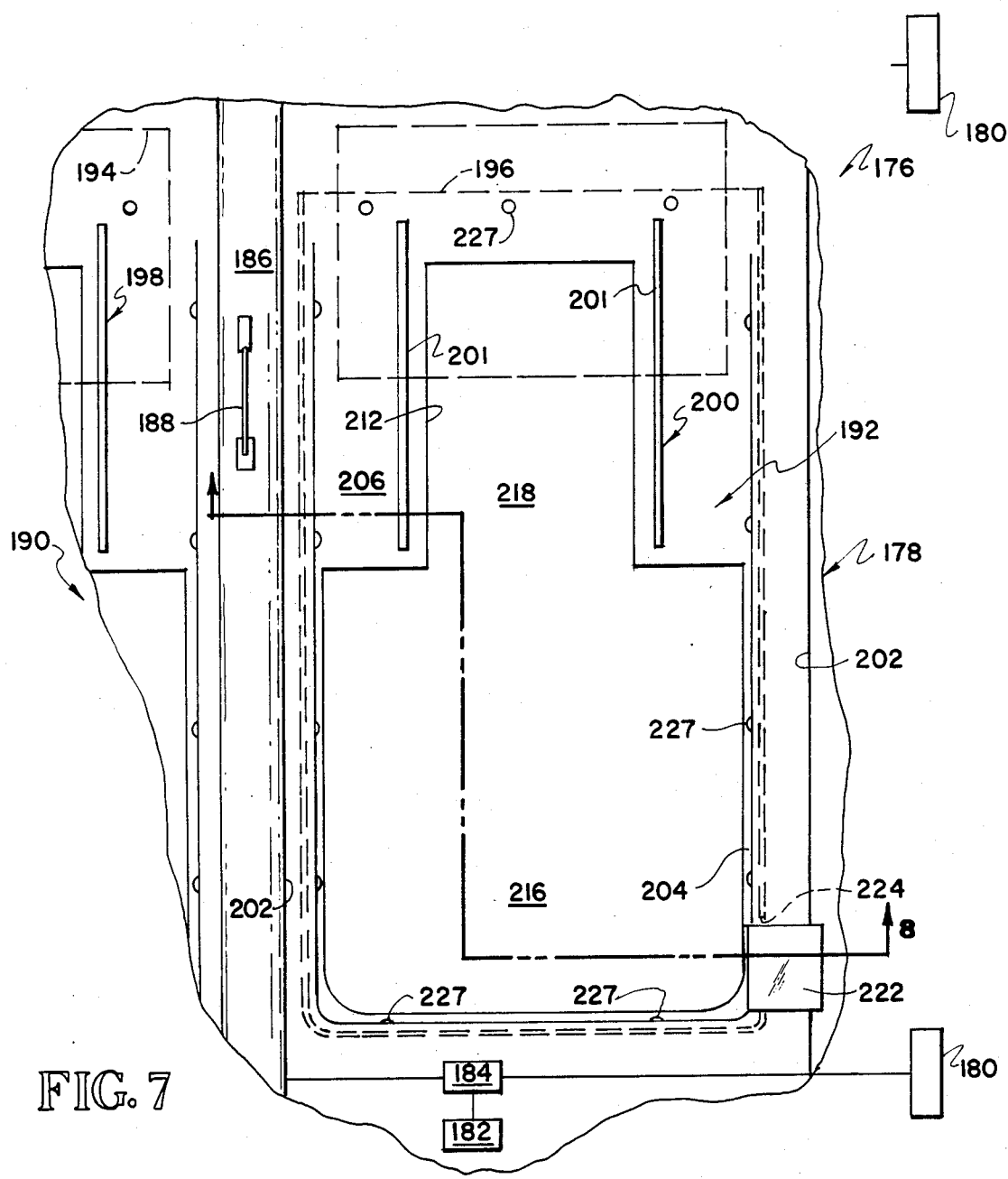
FIG. 7 is a top plan view of a rear passenger side floor pan area of a Type 181 Volkswagen Thing which has been repaired by an insert of this invention.
Figure 8:
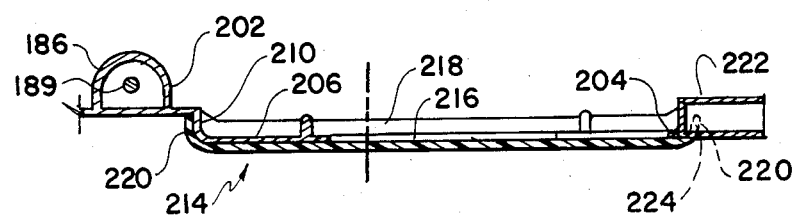
FIG. 8 is an enlarged cross-sectional view of the illustration of FIG. 7, taken substantially along line 8—8 thereof, as viewed in the direction indicated by the arrows.

Referring to FIGS. 7 and 8, there is illustrated a vehicle 176, specifically a Volkswagen Type 181 Thing. The vehicle 176 comprises a chassis 178 having four wheels 180 supported thereon. An engine 182 and transmission 184 are mounted on the chassis 178 and act to drive at least two of the wheels 180 to propel the vehicle 176 down a roadway (not shown).

The chassis 178 of the vehicle 176 includes an elongate hollow linkage tunnel 186 on which is mounted a parking brake lever 188 located rearwardly of a gear shift lever (not shown) positioned similarly to the gear shift lever 22 shown in FIG. 1. The lever 188 connects to a linkage 189 inside the tunnel 186 which in turn connects to the brakes (not shown) of at least two of the wheels 180 for manually manipulating the brakes of the vehicle 176 for parking purposes, as is conventional.

The rear floor pan areas 190, 192 of the vehicle 176 are located partially beneath a pair of front seats 194, 196, which are conventionally called driver's and passenger's seats, and extend toward the rear of the vehicle 176. The rear floor pan areas 190, 192 terminate at a location under the rear seat cushion (not shown). The seats 194, 196 are individually mounted on a pair of rails 198, 200 for linear sliding movement in a forward and rearward direction to provide more, or less, front seat leg room, as is conventional. The rails 201 of each pair 198, 200 are located much closer together than the rails 124 of each pair 120, 122 of the embodiment of FIGS. 5 and 6.

The rear floor pan areas 190, 192 each comprise a generally flat bottom or floor having a generally horizontal flat rear section 204, a slightly upwardly inclined front section 206 and an upstanding wall 210 extending along the rear of the floor and along the opposite longitudinal sides parallel to the edges 202. The rails 198, 200 are permanently secured, as by welding or the like, to the flat floor section 206 at locations well spaced from the edges thereof. Specifically, each individual rail 208 is located about one third of the width of the floor from the longitudinal edges 202 of the floor pan areas 190, 192. In the vehicle 176, it is the flat floor sections 204, 206 that typically experience corrosion. In repairing the vehicle 176 in accordance with this invention, the corroded areas of the flat floor sections 204, 206 are removed by cutting away the metal thereof by use of a saber saw, air chisel or the like. In addition, much of the sound metal is cut away to leave in place only a portion of the flat floor section 206 adjacent the seat rails 198, 200. Preferably, the amount and location of metal to be removed is dictated by the use of a templet (not shown). The vehicle 176 is somewhat peculiar and most of the repair work of this invention is done from the underside thereof as opposed to from the inside, as in the embodiments of FIGS. 1-6. The templet is used to mark off the area from which metal is to be removed. Preferably, the templet is generally toadstool shaped so that the metal removed leaves a substantial window 212 of generally toadstool configuration which is shortly closed by a rectangular insert 214 of this invention. In this embodiment, substantially all of the metal of the flat floor section 204 is removed. In addition, that portion of the inclined floor section 206 is removed except that on the outside of the seat rails 198, 200. The remaining metal of the pre-existing floor pan areas 190, 192 is prepared, by removing rust and scale and then priming or painting, to receive the insert 214 of this invention.

The insert 214 is substantially larger than the window 212 and is generally rectangular rather than toadstool shaped, as shown in FIG. 7. The insert 214 includes a generally flat central section 216, a forward slightly inclined flat section 218 and an upstanding wall 220 extending around the sides and rear of the insert 214. The upstanding wall 220 is relatively modest in size, normally about an inch in height along the rear end of the insert 214, tapering to nothing at the forward end of the inclined section 218.

One of the peculiarities of the vehicle 176 is the provision of a jack receptacle 222 extending into the passenger side rear floor pan area 192. Since the insert on the passenger side must accommodate the jack receptacle 222, a notch 224 is provided in the upstanding wall 220. It will be seen that an insert could be provided for the rear floor pan areas 190, 192 by removing the corroded metal and providing a flat fiberglass insert to be installed from the inside of the vehicle 176. In this event, the insert would be about the same toadstool shape as the templet used in the practice of this invention. The insert 214 is much preferred because the upstanding wall or flange 220 provides substantial mechanical strength.

In a manner similar to the inserts 70 and 150, the insert 214 of this invention is a fiberglass composite made of layers of glass fiber and a conventional organic polymeric resin. Similarly, ribs (not shown) may be provided on the underside of the insert 214 facing downwardly.

The insert 214 is secured to the vehicle 176 in any suitable fashion, as by the use of fasteners 227 such as pop rivets, nut and bolt assemblies and the like. As is evident from FIG. 7, the fasteners 227 extend horizontally through the generally vertical upstanding walls or lips 210, 220 of the metallic rear floor pans 190, 192 and the insert 214 respectively.

Figure 9:
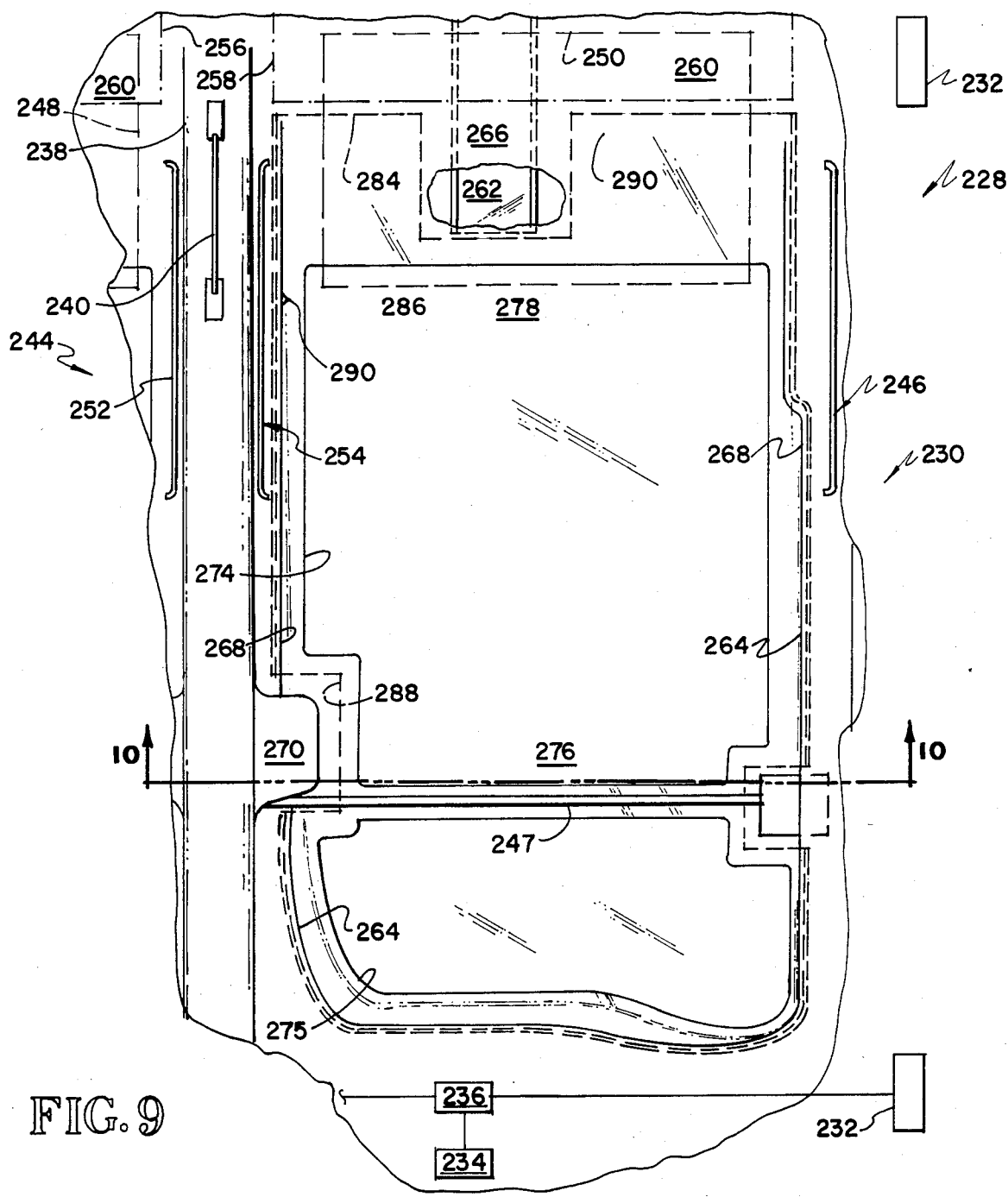
FIG. 9 is a top plan view of a rear passenger side floor pan area of a Type 3 Volkswagen which has been repaired by an insert of this invention.
Figure 10:
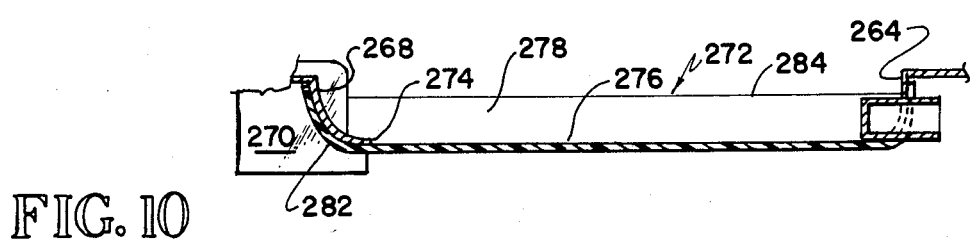
FIG. 10 is an enlarged cross-sectional view of the illustration of FIG. 9, taken substantially along line 10—10 thereof, as viewed in the direction indicated by the arrows.

Referring to FIGS. 9 and 10, there is illustrated a vehicle 228, specifically a Volkswagen Type 3. The vehicle 228 comprises a chassis 230 having four wheels 232 supported thereon. An engine 234 and transmission 236 are mounted on the chassis 230 and act to drive at least two of the wheels 232 to propel the vehicle 228 down a roadway (not shown).

The chassis 230 includes an elongate hollow linkage tunnel 238 on which is mounted a parking brake lever 240 located rearwardly of a gear shift lever (not shown) positioned similarly to the gear shift lever 22 shown in FIG. 1. The lever 240 connects to a linkage (not shown) inside the tunnel 238 which in turn connects to the brakes (not shown) of at least two of the wheels 232 for manually manipulating the brakes of the vehicle 228 for parking purposes, as is conventional.

The rear floor pan areas 244, 246 of the vehicle 228 are located partially beneath a pair of front seats 248, 250 which are conventionally called driver's and passenger's seats. The rear floor pan areas 244, 246 extend toward the rear of the vehicle 228 past a battery dividing wall 247 and terminate below a rear seat cushion (not shown). The seats 248, 250 are individually mounted on a pair of rails 252, 254 for linear sliding movement in a forward and rearward direction to provide more, or less, front seat leg room, as is conventional.

The front floor pan areas 256, 258 of the vehicle 228 extend from underneath the front seats 248, 250 toward the front of the chassis 230 and include a flat metallic floor 260 and an anti-buckling member 262, of channel cross-section, on the underside of the floor 260. The function of the anti-buckling member 262 is to add rigidity to the flat floor 260 to prevent it from oil-canning or buckling.

The rear floor pan areas 244, 246 each comprise a rear generally horizontal flat floor section 264, a forward flat floor section 266 inclined slightly upwardly relative to the section 264 and a lip or upstanding wall 268 extending around the rear and longitudinal sides of the flat sections 264, 266. A further peculiarity of the chassis 230 is the provision of an anti-sway bracket 270 in the center of the vehicle 228. In the vehicle 228, it has been found that the flat floor sections 264, 266 are subject to corrosion but that the anti-buckling member of channel 262 is not corroded badly in any vehicle worth repairing. Accordingly, it is normally desirable to retain the anti-buckling channel 262 to add rigidity to the repaired floor by attaching the insert of this invention to metal remaining adjacent the channel 262. To this end, the corroded areas of the flat floor sections 264, 266 and much of the sound metal are cut away by the use of a saber saw, air chisel or the like, cutting around the dividing wall 247, the anti-buckling channel 262 and the anti-sway bracket 270. Some of the metal adjoining the anti-buckling channel 262 is left to provide a secure anchorage for the insert 272 of this invention. Preferably, this removal is done from the underside of the vehicle 228 by placing a new insert 272 of this invention in the area where it is to go and removing substantially all of the flat sections 264, 266 except that area immediately around the battery dividing wall 247 to leave a pair of windows 274, 275 to be closed by the insert 272.

The insert 272 is sized to span the upstanding wall or lip 268 and provides a rearward generally horizontal flat section 276 and a forward slightly upwardly inclined flat section 278. A plurality of ribs (not shown) are provided on the undersides of the sections 276, 278 and face the roadway over which the vehicle 228 rides. As in other embodiments of this invention, the thickness of the ribs (not shown) is significantly greater than the thickness of the areas between the ribs (not shown). The insert 272 includes an upstanding wall or lip 282 adjoining the flat sections 276, 278 and extending along the rear and longitudinal sides of the insert 272. The lip 282 is of substantial height at the rear of the insert 272 and diminishes to nothing along the front edge of the section 278.

As in other embodiments of this invention, the insert 272 preferably extends forwardly underneath the front seats 248, 250. Each insert 272 is preferably long enough that it would interfere with the anti-buckling channel 262. To avoid this conflict, the forward end 284 of the insert 272 is provided with a large notch 286 to receive the end of the channel 262 and some of the pre-existing flat section 266.

In a similar fashion, the inner side of the insert 272 is provided with a large notch 288 to receive the anti-sway bracket 270 thereby allowing the insert 272 to be installed from the underside of the vehicle 228.

Similar to other inserts of this invention, the insert 272 of this invention preferably comprises a fiberglass composite made of layers of fiberglass cloth and mat wetted by a conventional organic polymeric resin, as is well known in the prior art.

As in the embodiment of FIGS. 7 and 8, the insert 272 of this invention is applied to the vehicle 228 from the underside of the chassis 230. The insert 272 is secured to the chassis 230 by the use of suitable fasteners 290 extending horizontally through the upstanding lip 268 of the metallic rear floor pan areas 244, 246 and through the upstanding lip 282 of the insert 272 along the rear and longitudinal sides of the insert 272. Adjacent the front edge 284 of the insert 272, where the lip 282 is absent, the fasteners 290 extend through part of the flat floor section 266 into metal integral with the anti-buckling channel 262.

Although the invention has been described in its preferred forms with a certain degree of particularlity, it is understood that the present disclosures is only by way of example and that numerous changes in the details of construction and in the combination and arrangement of parts may be resorted to without departing from the spirit and scope of the invention as hereinafter claimed.

I claim:

1. A repaired vehicle having a chassis providing a front and a rear, at least four wheels supported on the chassis, an engine and transmission supported on the chassis in driving engagement with at least two of the wheels, the chassis including a pair of metallic flat floor pans separating the inside of the vehicle from the ground and located partially underneath a pair of front seats of the vehicle and extending forwardly thereof toward the front of the chassis, the flat floor pan being bounded by a generally straight linkage tunnel between the front seats, a vertical generally planar gusset perpendicular to the tunnel adjacent the front end thereof, a generally planar rib perpendicular to the tunnel intermediate the ends thereof and a bent channel having a first generally straight section parallel to the tunnel and a second generally straight section inclined to the first section and defining an obtuse angle with the gusset, a substantial part of the metallic flat floor pan being cut away to leave a flat ledge not more than about 3" wide extending about the periphery of the metallic flat floor pan, the ledge extending away from the linkage tunnel, the planar gusset, the planar rib and the bent channel to define an open window, a generally flat insert supported by the ledge and covering the window, fasteners extending through the insert and the ledge securing the insert to the ledge and closing the window, the insert comprising a fiberglass composite including layers of glass fiber mat and layers of organic polymeric resin providing a first long straight side parallel to and juxtaposed to the linkage tunnel, a first long straight end adjoining the first side and parallel to and juxtaposed to the rib, a second straight side adjoining the first end and generally parallel to the first side and first channel section and juxtaposed to the first channel section, a third straight side adjoining the second side and generally parallel to and juxtaposed to the second channel section, and a second short end adjoining the first and third sides and being parallel to and juxtaposed to the gusset, the insert including ribs on the underside thereof facing the ground and extending perpendicular to the linkage tunnel.

2. The vehicle of claim 1 wherein the insert is substantially thicker at the ribs than between the ribs.

3. The vehicle of claim 2 wherein the tunnel includes an elongate hollow section having therein a first linkage leading from a gear shift lever, mounted on the tunnel, to the transmission, a pivotally mounted accelerator pedal including a second linkage connected to the accelerator and extending through the tunnel to the engine.

4. The vehicle of claim 3 wherein the insert comprises an accelerator pad on the underside thereof substantially thicker than the ribs, the accelerator pad being positioned adjacent the juncture of the first side and the second end, the accelerator pedal being pivotally mounted to the accelerator pad.

5. A repaired vehicle having a chassis providing a front and a rear, at least four wheels supported on the chassis, an engine and transmission supported on the chassis in driving engagement with at least two of the wheels, the chassis including a pair of metallic floor pans separating the inside of the vehicle from the ground and located partially underneath a pair of front seats of the vehicle and extending rearwardly thereof toward the rear of the chassis, a generally straight linkage tunnel between the front seats and located between the floor pans, each of the floor pans comprising a sunken well providing a generally flat floor, an upstanding wall connected to the flat floor and a generally horizontal flange connected to the upstanding wall and extending parallel to and generally away from the flat floor, a pair of downwardly and rearwardly inclined seat rails on each of the metallic floor pans including an inwardly extending seat stop, a substantial part of the metallic floor pan between the seat rails being cut away to leave a flat ledge not more than about 3" wide therebetween, the upstanding wall being cut away at locations spaced from the seat rails, the cut away areas of the metallic flat floor defining a window, an insert covering the window and comprising a fiberglass composite including layers of glass fiber and organic polymeric resin including a flat fiberglass bottom supported on the ledge, an upstanding fiberglass wall juxtaposed to the upstanding wall of the sunken well, and a generally horizontal fiberglass flange overlying and supported by the flange of the sunken well, and fasteners extending through the fiberglass flange and the flange of the sunken well for securing the insert over the window, the flange providing a pair of notches receiving the seat rail stops, the side edges of the flange converging slightly from the rear toward the notches, the side edges of the flange being substantially parallel from the front of the insert toward the notches, the notches each providing a generally L-shaped edge.

6. The vehicle of claim 5 wherein the vehicle is a convertible and the chassis further comprises a vertically extending rib on each side of the chassis at a location under the rear seat and the flange further provides a notch receiving the vertically extending rib.

7. The vehicle of claim 5 wherein the chassis provides a battery post extending upwardly adjacent the rear of the passenger side floor pan, and the flange of the insert provides a passage therethrough receiving the battery post.

8. A repaired vehicle having a chassis providing a front and a rear, at least four wheels supported on the chassis, an engine and transmission supported on the chassis in driving engagement with at least two of the wheels, the chassis including a pair of metallic floor pans separating the inside of the vehicle from the ground and located partially underneath a pair of front seats of the vehicle and extending rearwardly thereof toward the rear of the chassis, a generally straight linkage tunnel between the front seats and located between the floor pans, each of the floor pans comprising a generally flat rectangular floor including a pair of longitudinal edges, a central horizontal flat rear section and an upwardly inclined front section, a shallow upstanding wall extending about the rear and opposite sides of the flat floor, a pair of downwardly and rearwardly inclined seat rails affixed to each of the inclined front sections, each pair of seat rails being spaced apart substantially less than the width of the floor pan, each of the seat rails being located at about onethird the width of the floor pan from the nearest longitudinal edge thereof, the metallic flat floor being cut away to remove all of the rear section and part of the inclined front section between the seat rails to define a generally toadstool shaped window, a generally rectangular insert disposed on the underside of the vehicle and covering the toadstool shaped window and comprising a fiberglass composite including layers of glass fiber and organic polymeric resin including a generally flat rear section, a flat slightly upwardly inclined forward section and an upstanding wall extending along the longitudinal sides of the insert and the rear end thereof, and fasteners extending through the upstanding walls of the metallic floor pan and the fiberglass insert.

9. The vehicle of claim 8 wherein the chassis includes a jack receptacle extending over the rear end of the rear floor pan area through the upstanding wall of the metallic floor pan and the insert includes a notch in the fiberglass upstanding wall at a location receiving the jack receptacle.

10. A repaired vehicle having a chassis providing a front and a rear, at least four wheels supported on the chassis, an engine and transmission supported on the chassis in driving engagement with at least two of the wheels, the chassis including a pair of metallic front floor pans separating the inside of the vehicle from the ground and located partially underneath a pair of front seats of the vehicle and extending forwardly thereof toward the front of the chassis providing a flat metallic floor having an anti-buckling channel on the underside thereof, a pair of metallic rear floor pans separating the inside of the vehicle from the ground and located partially underneath the pair of front seats of the vehicle and extending rearwardly thereof toward the rear of the chassis, a vertical dividing wall extending upwardly from the rear floor pans adjacent the rear end thereof, a generally straight linkage tunnel between the front seats and located between the pair of front floor pans and between the pair of rear floor pans, each of the rear floor pans comprising a flat rear generally horizontal floor section and a flat slightly upwardly inclined front floor section defining a pair of longitudinal sides and a lip extending about the rear of the floor and the longitudinal sides, a substantial part of the metallic flat floor sections being cut away to leave a window in the bottom of the vehicle on each side of the vertical dividing wall and some metal adjacent the anti-buckling channel, an insert on the underside of the vehicle covering the window and comprising a fiberglass composite including layers of glass fiber and organic polymeric resin including a rear generally horizontal flat section and a forward slightly upwardly inclined flat section providing a pair of longitudinal edges and a lip extending about the rear of the insert and the longitudinal edges, the forward end of the insert providing a large notch straddling the anti-buckling channel, fasteners extending through the upstanding lip of the rear metallic floor pan and the lip of the fiberglass insert, and fasteners extending through the forward end of the insert through metal adjacent the anti-buckling channel.

11. The vehicle of claim 10 wherein the chassis further comprises an enlarged anti-sway bracket inside the vehicle adjacent the center thereof, the anti-sway bracket being between the rear metallic floor pan areas, each of the rear fiberglass inserts comprising a notch on the inside longitudinal edge thereof accomodating the anti-sway bracket.

12. The vehicle of claim 11 wherein the chassis further comprises a jack receptacle on the rear passenger side overlying the rear of the metallic floor pan, the rear of the fiberglass insert including a notch receiving the jack receptacle.

* * * * *